G. J. ADAM.
ANTISKIDDING TIRE.
APPLICATION FILED OCT. 18, 1909.

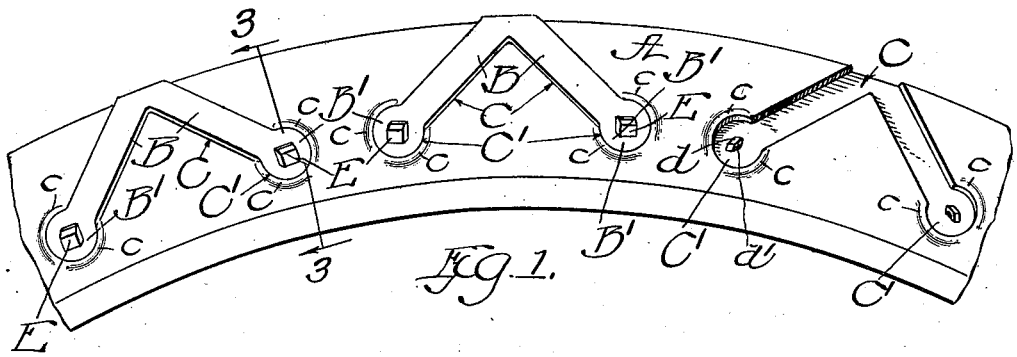
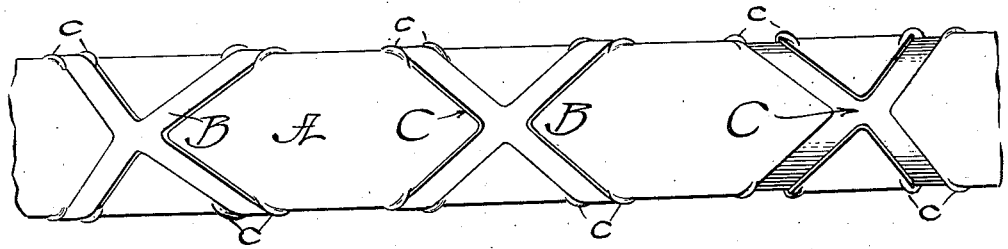
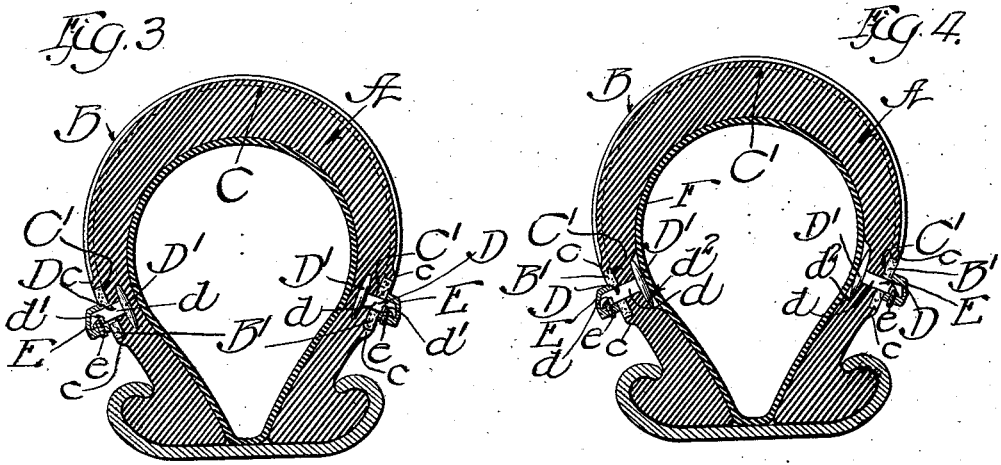

1,014,357.

Patented Jan. 9, 1912.
2 SHEETS—SHEET 2.

Witnesses:

Inventor
George J. Adam
by Paul & Browne
Attys

UNITED STATES PATENT OFFICE.

GEORGE J. ADAM, OF CHICAGO, ILLINOIS.

ANTISKIDDING TIRE.

1,014,357. Specification of Letters Patent. Patented Jan. 9, 1912.

Application filed October 18, 1909. Serial No. 523,309.

*To all whom it may concern:*

Be it known that I, GEORGE J. ADAM, a citizen of the United States, and a resident of Chicago, in the county of Cook and State of Illinois, have invented certain new and useful Improvements in Antiskidding Tires; and I do hereby declare that the following is a full, clear, and exact description thereof, reference being had to the accompanying drawings, and to the letters of reference marked thereon, which form a part of this specification.

This invention relates to improvements in anti-skidding tread devices for yielding tires, such as pneumatic cushion or soft rubber tires, and particularly to improvements in that type of such devices in which tough, non-metallic, flexible pads, such as leather pads, are provided for producing friction between the tire and the road.

The invention consists of a novel construction for attaching the pads to the tread of the tire, arranged to permit of the ready detachment of the pad when it becomes worn, and the substitution in its place of a new pad.

The various advantages of my improvement will appear as I proceed with my specification.

The invention consists in the combination of parts hereinafter described and more particularly pointed out in the appended claims.

Figure 5:
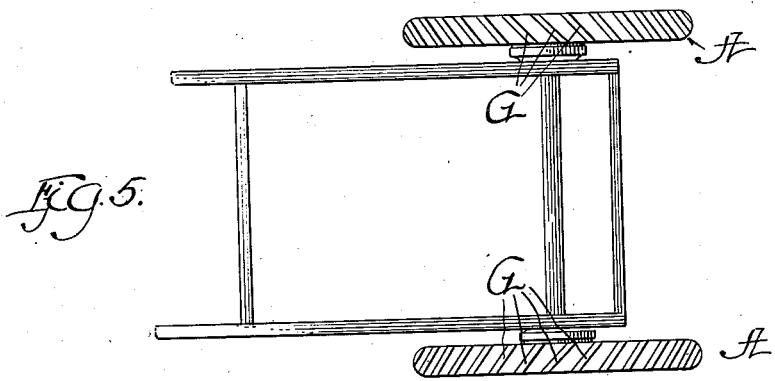
Figure 6:
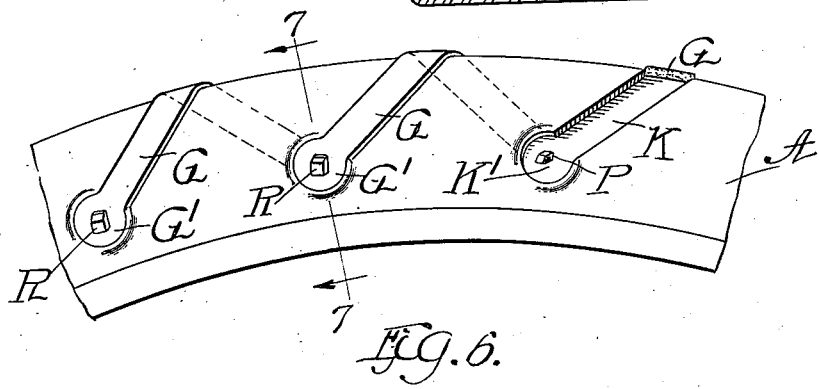
Figures 7, 8:
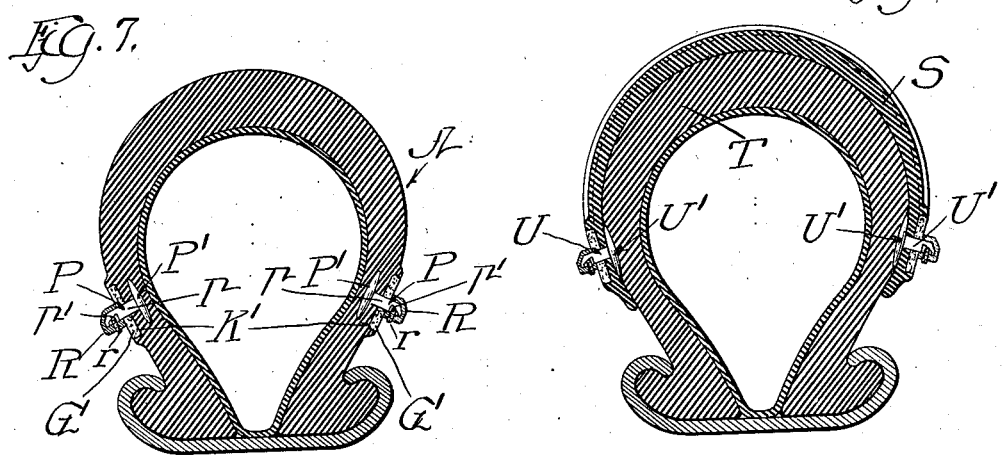

In the drawings:—Figure 1 is a side elevation of a portion of a tire having pads of one form attached to it in accordance with my invention. Fig. 2 is a top plan view of the same. Fig. 3 is a cross-section through the tire on the line 3—3 of Fig. 1. Fig. 4 is a similar cross-section illustrating a slightly modified form. Fig. 5 is a bottom plan view of the rear wheels of an automobile showing a different type of pad. Fig. 6 is a side elevation of a portion of a tire provided with the pads illustrated in Fig. 5, with the pads attached in accordance with my invention. Fig. 7 is a cross-section through Fig. 6 on the line 7—7 thereof. Fig. 8 is a similar section showing a modified form of tire.

Referring now to that form of my invention illustrated in Figs. 1 to 3, A represents the tire, and B, the anti-skidding tread devices. Each anti-skidding tread device B consists of a pad that is made of leather, or of any other suitable non-metallic, tough, flexible material which tends to induce friction. The pads are arranged symmetrically about the tread of the tire. In the figures referred to these pads are in the form of an X.

C indicates a groove or channel formed in the outer tread surface of the tire of a shape to receive the pads B. Said channels extend about the sides of the tire and at their ends are formed laterally extended portions $C^1$, preferably of symmetric form, which are adapted to receive similarly extended portions $B^1$ provided at the ends of the X-shaped pads. The channel C is of a less depth than the thickness of the pads B so that the pads, when in position in the channels, project beyond the surface of the tread. About the laterally extended portions $C^1$ of the channel are preferably formed shoulders $c\ c$ on the tire surface, which shoulders increase the depth of the widened portions $C^1$ of the channels so that the laterally extended ends of the pad lie completely within the channel.

The ends of the pads are anchored by means of bolts D having enlarged flat heads $D^1$ which are anchored in the body of the tire fabric. Said bolts are located at the ends of the channels with their shanks $d$ projecting outwardly a sufficient distance for them to pass through the ends of the pad and to receive a locking head E. Said head is in the form of a cap which fits over the end of the shank $d$ and carries a set-screw $e$ which engages in a notch $d^1$ formed in the said shank. By withdrawing the set-screw $e$ a short distance, the cap may be removed from the end of the shank and the end of the pad disengaged therefrom. It will be noted that it is unnecessary to completely remove the set-screw, which is an advantage in that the screw is not likely to be lost.

The pull on the pad is taken up by the side walls of the channel C at the laterally extended part $C^1$ thereof, supplemented by the raised shoulders $c\ c$ formed on the surface of the tire. As illustrated in Fig. 3, the head $D^1$ of the bolt D is located within the tire fabric itself. In Fig. 4 the said head is shown located between the inner wall of the outer tire and the outer wall of the inner tube F, as indicated at $d^2$.

In Figs. 5 to 7 there is shown a pad of different form. The pads here illustrated comprise single lengths of antiskidding fabric G provided at their opposite ends, as before, with laterally extended portions G¹, each pad being attached so as to run at an angle with the tread, with one end attached on one side of the tire and the other on the opposite side of the tire. Said pads are attached as before,—K indicating the channels, K¹ the laterally extended channel ends in which are located the laterally extended ends G¹ of the pads, P the bolt with its head P¹ located in the fabric of the tire, and R the retaining cap. With an anti-skidding pad of this type, it is preferable to arrange the pads on the tires with the pads on one tire at an angle to those on the opposite tire, as illustrated in Fig. 5. With this arrangement practically the same effect is obtained with the straight pads illustrated in Figs. 5 and 7, as by the X-shaped pads illustrated in Figs. 1 to 3.

In some cases it is preferable to form an outer tread covering S of rubber or other suitable material as shown in Fig. 8, which is adapted to be sprung upon the tire T. In such case the channels are formed in said outer tread covering and the pads attached as before. In this case the heads U¹ of the bolts U are arranged to lie between the inner face of said outer covering and the outer face of the tire.

My improved construction for attaching antiskidding pads, as will be apparent, is not limited to any form of pad but may be adapted for use with pads of forms other than those shown, it being simply necessary to form the channels in the tire or in the outer tread covering, in the case of the use of such covering, of a shape to receive and hold the pad. The details herein shown and described may be variously modified without departing from the spirit of my invention.

I claim as my invention:—

1. An anti-skidding tread device for tires comprising, in combination with a tire having an outer tread surface provided with open channels running across the tread and extending about the sides of the tire, anti-skidding pads of tough, non-metallic, flexible material confined in said channels, the thickness of said pads being greater than the depth of said channels, and said pads and channels being laterally extended at their ends.

2. An anti-skidding tread device for tires comprising, in combination with anti-skidding pads, a tire having an outer tread surface provided with open channels running across the tread and extending about the sides of the tire, said channels being adapted to receive the pads and having walls adapted to engage the marginal edges of the pads, and bolts anchored to the tire adapted to anchor the ends of said pads within the ends of said channels, said bolts being provided with detachable caps to engage the outer surface of the pads.

3. An anti-skidding tread device for tires comprising, in combination with anti-skidding pads provided with lateral extensions at their ends, a tire having an outer tread surface provided with channels running across the tread and extending about the sides of the tires, said channels being conformed to receive the pads and being laterally extended at their ends to receive the lateral extensions of said pads with the walls of the channels in engagement with the marginal edges of the pads, the channels at the end being of a depth substantially equal to the pads, and means for detachably securing the ends of said pads within the channels.

4. An anti-skidding tread device for tires comprising, in combination with anti-skidding pads, a tire having an outer tread surface provided with open channels running across the tread and extending about the sides of the tire, said channels being adapted to receive the pads and having walls adapted to engage the marginal edges of the pads, bolts anchored to the tire adapted to anchor the ends of said pads within the ends of said channels, said bolts having notched shanks adapted to project beyond the surface of the pads, and caps adapted to fit the ends of the bolt shanks, said caps being provided with locking means adapted to engage said notched shank.

In testimony that I, GEORGE J. ADAM, claim the foregoing as my own invention I affix my signature in the presence of two witnesses, this first day of October A. D. 1909.

GEORGE J. ADAM.

Witnesses:
G. W. BRACKENBURY,
FRANK N. HARPER.